United States Patent

[11] 3,631,952

[72] Inventors Hiroshi Sugimoto;
 Mikio Kaneko, both of Toyota, Japan
[21] Appl. No. 27,498
[22] Filed Apr. 13, 1970
[45] Patented Jan. 4, 1972
[73] Assignee Toyota Jidosha Kogyo Kabushiki Kaisha
 Toyota, Aichi Prefecture, Japan
[32] Priority June 21, 1969
[33] Japan
[31] 44/49226

[54] INTEGRAL SHIFTING KEY FOR A SYNCHRONIZING TRANSMISSION
 5 Claims, 14 Drawing Figs.
[52] U.S. Cl. .................................... 192/53 F,
 74/339, 192/48.91
[51] Int. Cl. .................................... F16d 23/06
[50] Field of Search .......................... 192/53 F;
 74/339

[56] References Cited
UNITED STATES PATENTS
2,221,900 11/1940 White et al. .................. 192/53 F Primary Examiner—Allan D. Hermann
Attorney—Connolly and Hutz ABSTRACT: Change gear synchronizer according to present invention is characterized by axially shifting keys integrally connected together and located between outside of clutch hub and inside surface of clutch hub sleeve. Sleeve is connected to rotate with clutch hub but is arranged to shift axially relative thereto. Integral nature of shifting key assembly prevents individual keys from popping out from between clutch hub and clutch hub sleeve. Integral assembly of shifting keys urges synchronizer ring into frictional contact with rotating gear to thereby provide smooth synchronizing action between rotating gear and clutch hub.

3,631,952

INTEGRAL SHIFTING KEY FOR A SYNCHRONIZING TRANSMISSION

BACKGROUND OF THE INVENTION

The present invention relates to a change-gear synchronizer, and more particularly to a change-gear synchronizer including an integral assembly of key elements for bringing about synchronizing action between rotating and rotatable gears.

In many conventional synchronizing mechanisms for change gears in automobiles, an adequate number of conventional Borg Warner type shifting keys are separately fitted at specified intervals on the inside surface of a clutch hub sleeve. These keys are not integrally related in the circumferential direction. Often, the forward ends of these keys tend to pop out away from the inside surface of the clutch hub sleeve when the sleeve is shifted axially for the purpose of manipulating the keys. When this occurs the clutch hub sleeve in the change gear often becomes immobilized. This particular malfunction is usually described as "gear sticks" and a malfunction of this type can easily cause a serious accident.

Accordingly, it is an object of the present invention to avoid the above disadvantages by providing a unique assembly of shifting key elements which functions in a highly successful and trouble-free manner in bringing about synchronizing action between rotating and rotatable gears.

SUMMARY OF THE INVENTION

In accordance with the present invention a change gear comprises a rotating gear and a coaxially disposed rotatable gear. A clutch hub sleeve is connected to the rotatable gear for rotation therewith but the sleeve is axially slidable relative to the rotatable gear. A coaxial rotatable synchronizer ring between the gears is connected to rotate with the clutch hub sleeve and the rotatable gear. The synchronizer ring transmits the rotational motion of the rotating gear to the rotatable gear when the clutch hub sleeve is axially shifted toward the rotating gear. An assembly of key elements is located on the outside of the rotatable gear between the rotatable gear and the inside of the clutch hub sleeve. The assembly of key elements engages the synchronizer ring and moves with the clutch hub sleeve so that axial shifting of the clutch hub sleeve toward the rotating gear causes the assembly of key elements to force the synchronizer ring frictionally against the rotating gear. This provides synchronizing action between the gears. The improvement of the present invention comprises an assembly of key elements in which the individual elements of the assembly are integrally connected together.

BRIEF DESCRIPTION OF THE DRAWINGS

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
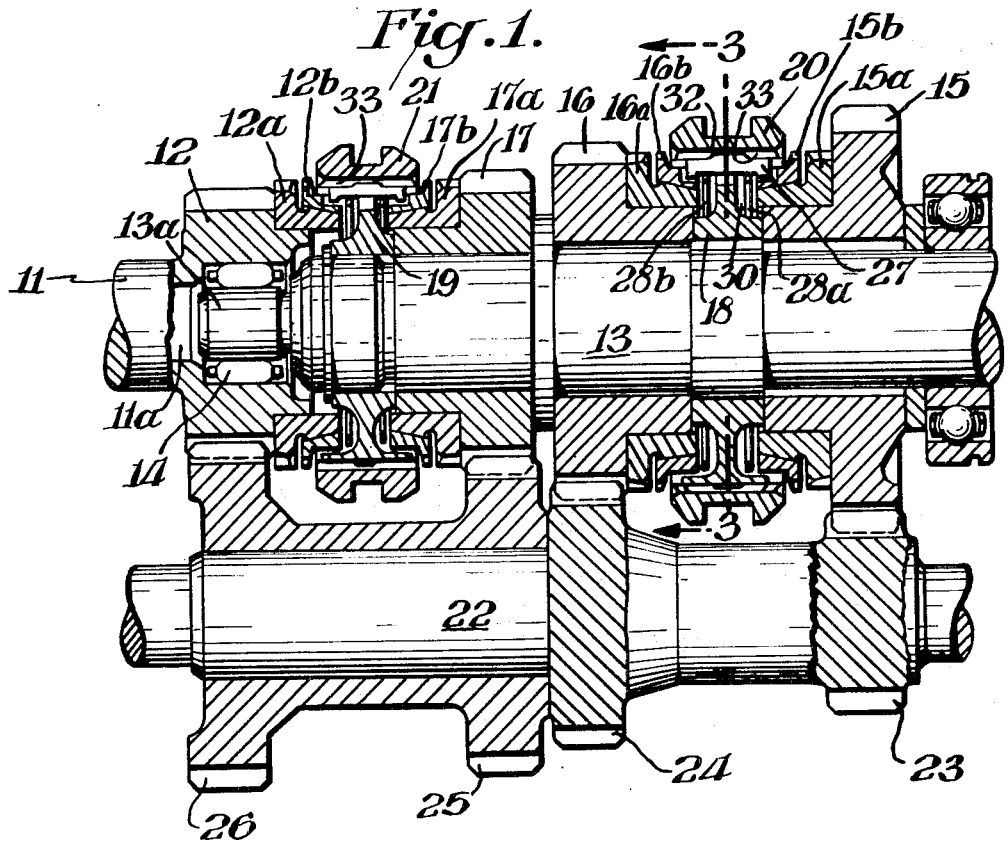
FIG. 1 is a sectional view of a change gear equipped with a conventional synchronizing mechanism.

As background, FIG. 1 illustrates a change-gear mechanism in which the present invention may be used to bring about synchronizing action between gears. The change gear of FIG. 1 has four forward transmissions and one reverse. In the forward transmission, an input shaft 11 extends inwardly to transmit the engine power to the change gear via the clutch. As viewed in FIG. 1, the right-hand end of the input shaft 11 is integrally connected to an input gear 12.

Figure 3:
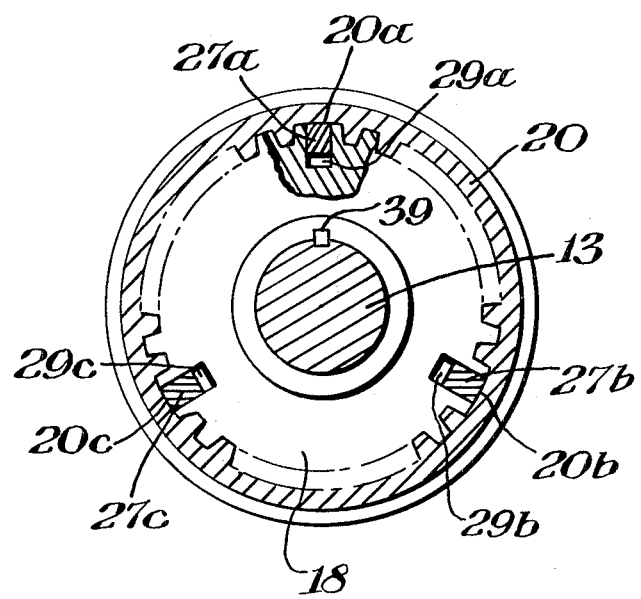
FIG. 3 is a sectional view taken along line 3–3 of FIG. 1.
Figure 4:
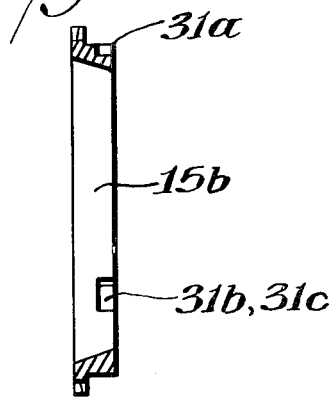
FIG. 4 is a sectional view illustrating a synchronizer ring of the change gear shown in FIGS. 1–3.

An output shaft 13 is coaxially arranged with the input shaft 11. The hollow 11a of the input shaft 11 supports the end 13a of the output shaft 13 through a bearing 14. The input and output shafts are mutually rotatable. Three gears 15, 16, 17 are fitted to the output shaft 13 for rotation relative to the output shaft. Spline pieces 15a, 16a, 17a and 12a are integrally connected to the gears 15, 16, 17 and 12, respectively. Spline teeth are provided on the periphery of the pieces 15a, 16a, 17a and 12a and these teeth mesh with corresponding clutch hub sleeves 20, 21. Two clutch hubs or rotatable gears 18, 19 are integrally fitted by appropriate structure to the output shaft 13 for rotation therewith. The clutch hub 18 is integrally fixed by a key 39 to the output shaft 13 and the other clutch hub 19 is similarly integrated with the output shaft 13. The clutch hub sleeves 20, 21 are connected by splines to the outside surface of the clutch hubs or rotatable gears 18, 19, as best shown in FIG. 3. The clutch hub sleeves are arranged to rotate with the clutch hubs 18, 19 but are free to slide axially relative to the clutch hubs.

When the clutch hub sleeve 20 shifts to the right as viewed in FIG. 1, it meshes with the spline teeth of the spline piece 15a on the first gear 15. Similarly, the clutch hub 20 meshes with the spline teeth of 16a of the second gear 16 when the clutch hub sleeve 20 is shifted to the left. Thus, the first gear 15 or the second gear 16 is brought into integral relationship with the clutch hub 18 by shifting of the clutch hub sleeve 20. The power transmission between the input and output shafts is thereby completed. Synchronizer rings 15b 16b, 17b and 12b are provided for bringing about synchronizing action. The function and manipulation of the synchronizer rings is described more fully below.

A countershaft 22 is disposed in parallel relationship relative to the output shaft 13. The countershaft 22 has four gears 23, 24, 25 and 26 for causing various power transmissions. The gears 23, 24, and 25 mesh with the transmission gears 15, 16 and 17, respectively, supported on the output shaft 13. The counter drive gear 26 meshes with the input gear 12 to transmit the torque of the input shaft 11 to the countershaft 12 whereby the countershaft continuously rotates with the input shaft 11. Since the countershaft rotates continuously the gears 15, 16 and 17 of the output shaft 13 also rotate continuously. The greatest speed reduction between the input and output shafts is obtained from engagement between the gears 23 and 15. The next greatest speed reduction is obtained by engagement between gears 24 and 16. This reduction is followed by engagement of gears 25 and 17.

The change gear of FIG. 1 has a conventional Borg Warner type synchronizer to which the present invention is related. This Borg Warner type synchronizer is a typical one of inertia lock type. The synchronizer provided between the first gear 15 and the second gear 16 is located between the clutch hub sleeve 20 and the spline pieces 15a and 16a. The components of this synchronizer include the synchronizer rings 15b and 16b the shifting keys 27 and key springs 28a and 28b. The synchronizer rings are fitted to the bases of the spline pieces 15a and 16a for tapered frictional contact. Spline teeth are located on the peripheries of the synchronizer rings. The clutch hub 18 is integrated with the output shaft 13 by a key 39, as best shown in FIG. 3. Equally spaced-apart recesses 29a, 29b and 29c are provided in the periphery of the clutch hub 18. The recesses receive the keys 27a, 27b and 27c so that the keys are slidably disposed in the recesses for axial shifting. A pocket 30 formed inside the clutch hub 18 holds the key springs 28a and 28b which springs function to push the shifting keys outwardly in radial directions. The key springs force the shifting keys into recesses 20a, 20b and 20c on the inside of the clutch hub sleeve 20. As shown best in FIG. 3 the clutch hub sleeve has an inner spline which meshes with the outer spline on the clutch hub 18. The synchronizer ring 15b is designed in similar fashion and functions in a manner similar to synchronizer ring 16b.

In operation, the shifting keys 27 are pressed against the inner spline of the clutch hub sleeve 20 by means of the key springs 28a and 28b. The projection 32 on each key fits into the recess 33 of the inner spline of the clutch hub sleeve 20. Thus, each key 27 shifts axially along with the clutch hub sleeve 20 when the sleeve is shifted. Both ends of each shifting key 27 fit into the recess 31 in the synchronizer rings 15b and 16b. Thus, the clutch hub 18, clutch hub sleeve 20 and synchronizer rings 15b and 16b rotate together.

Movement of the clutch hub sleeve 20 to the right as viewed in FIGS. 1 and 3, is accompanied by a rightward movement of the shifting keys 27. The right end of each shifting key then urges the synchronizer ring 15b axially toward the spline piece 15a. The right chamfer of the inner spline of the clutch hub sleeve 20 engages the chamfer of the spline of the synchronizer ring 15b. Thus, the synchronizer ring 15b is shifted axially and is caused to rotate through frictional engagement with the spline piece 15a. As the force increases at the tapered frictional interface between the inside surface of the synchronizer ring 15b and spline piece 15a, the difference in rotation between the synchronizer ring 15b and the rotating spline piece 15a is suddenly reduced until both 15a and 15b rotate at the same speed thereby bringing about the desired synchronization between these parts. The clutch hub sleeve 20 is prevented from further movement to the right by chamfer engagement with the synchronizer ring 15b. This engagement continues until synchronization is achieved. Once synchronization occurs the projections on the keys ride out of the recesses in the clutch hub sleeve which enables the clutch hub sleeve to shift further to the right. Ultimately, the clutch hub sleeve 20 meshes with the spline of the synchronizer ring 15b and the spline of the spline pieces 15a connected to the first gear 15. Thus, the power transmission is completed from the input shaft 11 to the output shaft 13.

In the above-described system, the shifting keys 27 occasionally pop out and become inclined in the engaged state of change gears. It is then impossible to bring the transmission to a neutral condition. This problem is caused in part by the shape and length of the projection on the shifting key 27, the wearing away of the clutch hub sleeve 20 and the operator fork (not shown), the wearing away of the tapered faces of the synchronizer rings and spline pieces, etc.

Figure 2:
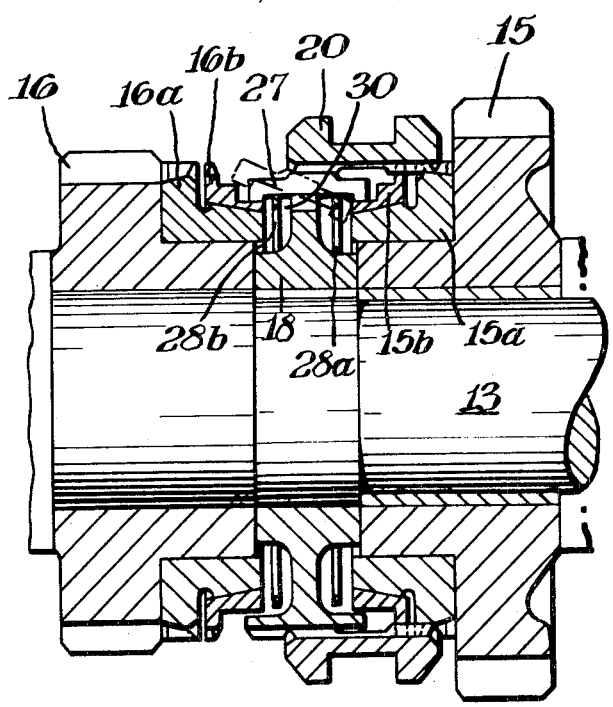
FIG. 2 is an enlarged sectional view of a portion of the change gear shown in FIG. 1.

As indicated in dotted outline of FIG. 2 this phenomenon occurs when the shifting keys 27 pip out excessively over the end of the clutch hub sleeve 20. The keys are urged outwardly by the key springs 28a and 28b to the inclined position illustrated in FIG. 2. The keys are then out of engagement with the recesses 31 in the synchronizer rings. Often, the keys climb on top of the rings, as best shown in FIG. 2.

Figure 5:
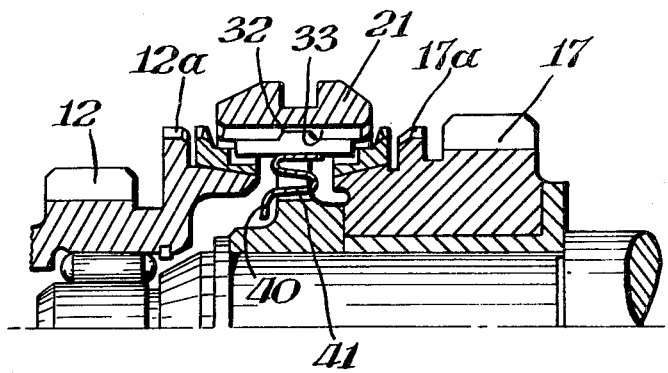
FIG. 5 is a partial sectional view of a change-gear synchronizer with a shifting key assembly according to the present invention.
Figure 6A:
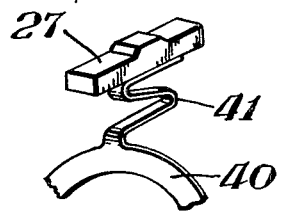
FIGS. 6a, b, c, and d are perspective views of various modifications of the shifting key assembly according to the present invention.
Figure 6B:
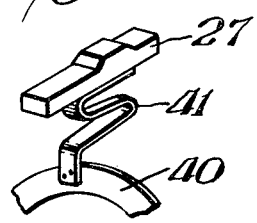
Figure 6C:
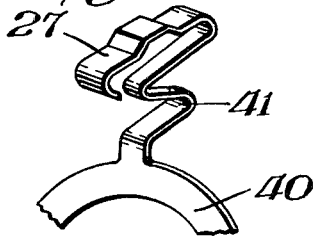
Figure 6D:
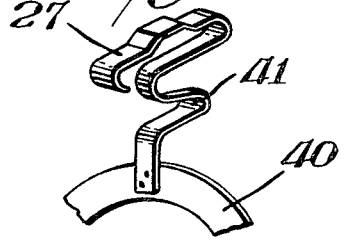

The present invention is based upon the discovery the circumferential integration of a plurality of shifting keys prevents the keys from popping out and becoming inclined. FIGS. 5 and 6 illustrate one embodiment of the present invention wherein the shifting keys 27 are fitted to a circular ring 40 by spring-connecting members 41. The rings are located between the outside of the rotatable gears 18, 19 and the inside of the clutch hub sleeves 20, 21. FIG. 6a illustrates a conventional shifting key 27 bonded or welded to an end of a spring-connecting member 41 which is integral with the circular ring 40. The shifting key is fitted at its midpoint to the spring-connecting member 41 and the spring-connecting member extends radially from the circular ring. The embodiment of FIG. 6b is somewhat like the embodiment of FIG. 6a except that the spring-connecting member 41 and the circular ring 40 are constructed separately and then connected together by a bonding or welding operation, for example. In the embodiment of FIG. 6c, the free end portion of the spring-connecting member 41 is extended and configured so as to form a shifting key 27. Also, the embodiment of FIG. 6d is similar to FIG. 6c except for the fact that the spring-connecting member and circular ring are separately fabricated and then secured together by bonding or welding.

The change gear shown in FIG. 5 is equipped with a mechanism of the type shown in FIG. 6a. In this embodiment, even when the clutch hub sleeve 21 is shifted axially the key 27 fitted to the circular ring 40 is not caused to pop out excessively. Also, since the spring-connecting member 41 is secured at the midpoint of the shifting key 27, there is little if any likelihood of the shifting key 27 becoming inclined.

Figure 7:
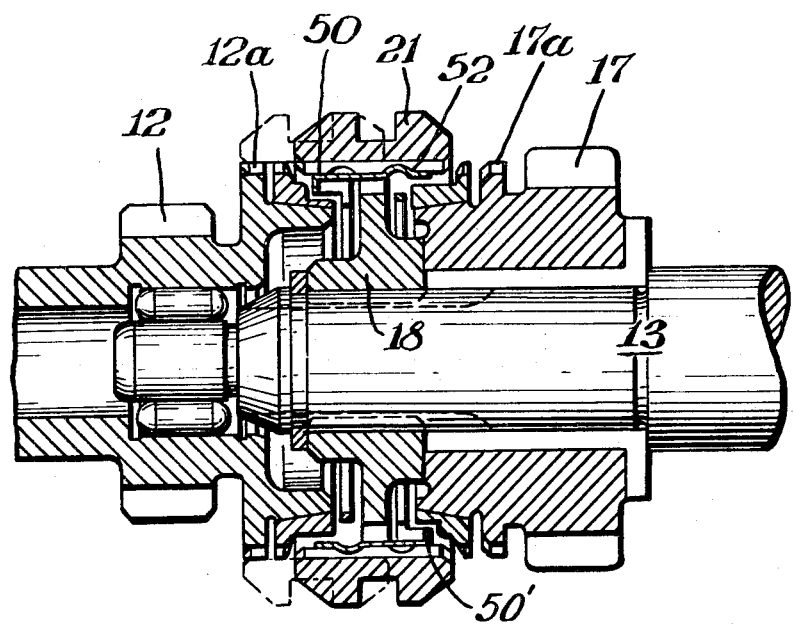
FIGS. 7 and 8 illustrate another embodiment according to the present invention.
Figure 8:
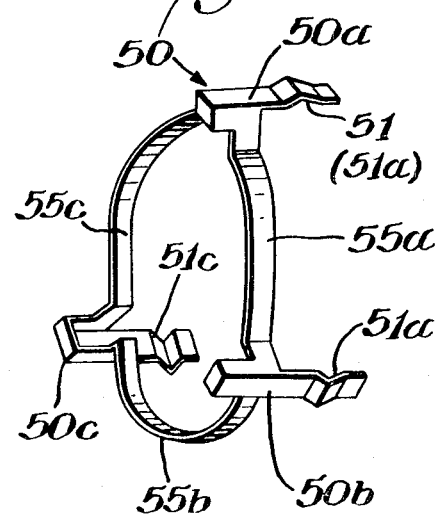

FIGS. 7 and 8 illustrate still another embodiment of the present invention wherein the shifting key 50 has a boxlike portion formed of sheet metal or similar materials. Three shifting keys 50a, 50b and 50c are provided with the keys interconnected by link strips 55a, 55b and 55c. As shown best in FIG. 8, the link strips form the circular ring which integrates the keys. A projection 51 is provided on each key 50 with the projection located slightly away from the plane of the circular ring. Recesses 52 on the clutch hub sleeve 21 receive the projections 51 of the shifting keys. As in the other embodiments of the present invention, when the clutch hub sleeve 21 is axially shifted, the keys 50a, 50b and 50c are prevented from popping out and becoming inclined in view of their integrated nature. In this embodiment of the present invention when the clutch hub sleeve 21 is shifted to the right from the position illustrated in phantom outline in FIG. 7 the right end of the clutch hub sleeve 21 engages and climbs over the projection 51 of each shifting key 50. Thus, the right end of the clutch hub sleeve 21 is prevented from being moved to the right by the projection 51 of each key 50 under the influence of the radially outward spring force. Such action is commonly called "gear locking action" which in recent years has been popularly utilized for insuring reliable engagement of change gears. The embodiment of the invention illustrated in FIG. 8 can only bring about synchronization when the clutch hub sleeve is moved in one direction. Accordingly, if engagement of the gears for transmission purposes in both directions is desired, a pair of devices including keys 50 and 50' are required. In FIG. 7 a pair of such units are illustrated in combination with the remaining transmission structure.

Figure 9:
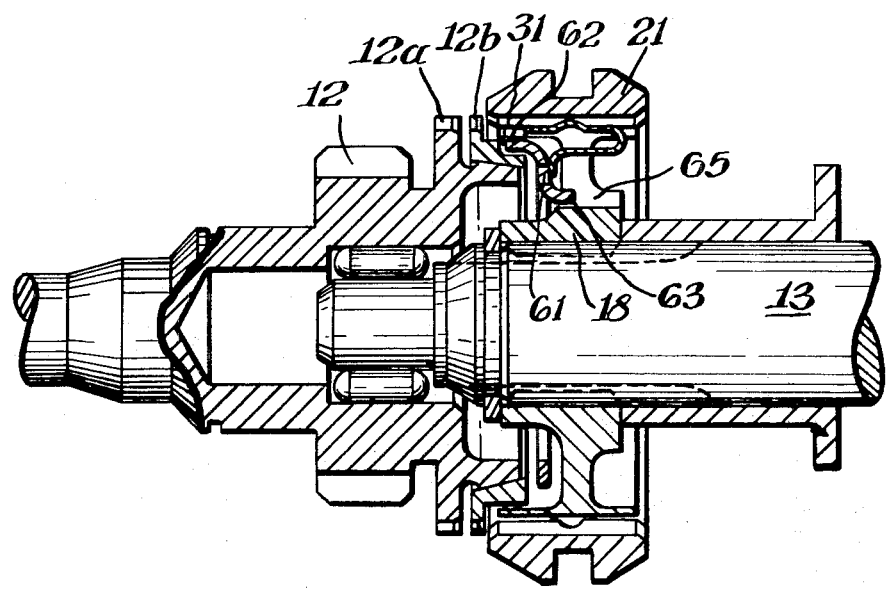
FIGS. 9 and 10 illustrate still another embodiment of the present invention.
Figure 10:
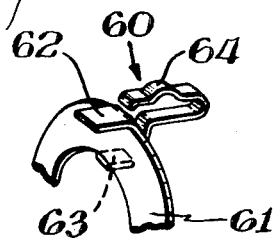
Figure 11:
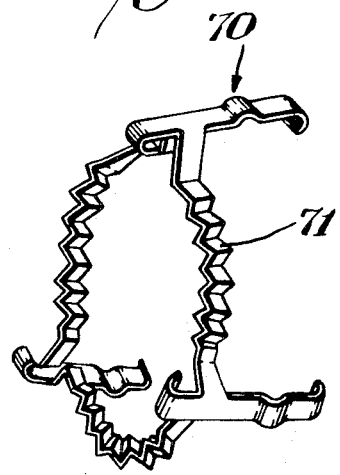
FIG. 11 shows another embodiment according to the present invention.

FIGS. 9 and 11 illustrate another embodiment of the present invention with details of the shifting key 60 shown best in FIG. 10. The assembly of shifting keys includes a circular ring 61 made of relatively thick rigid steel plate or similar material. A tongue 62 bent in the axial direction projects on the outside of the ring 61. The tongue 62 fits into the recess 31 of the synchronizer ring 12b. Another tongue 63 axially bent in the reverse direction projects into a notch 65 in the clutch hub 18. Each shifting key 60 is fabricated from relatively thin steel and can be welded or otherwise bonded to circular ring 61 in the manner best shown in FIG. 10. An outward spring force acts on each shifting key 60 which force is imparted to it by the relatively thin nature of the sheet metal from which the keys are fabricated.

FIG. 9 shows a change gear equipped with the assembly of shifting key elements illustrated in FIG. 10. In this embodiment, the torque of the clutch hub 18 is transmitted to the synchronizer ring 12b through the inwardly projecting tongue 63 on the circular ring 61 and the outwardly projecting tongue 62 also on the ring 61. The ring and tongues are made sufficiently strong for the purpose of transmitting high-output torque. Since the shifting key does not bring about the torque transmission, it can be made of relatively thin material. Moreover, a soft spring action is assured so the clutch hub sleeve 21 can satisfactorily function for changing gears. In the present embodiment, the tongue 62 fitting into the recess 31 in ring 12b does not move in a radial direction. Accordingly, the area of the recess 31 can be quite narrow and the average effective diameter of the tapered surface of the ring 12b can be increased. Increasing this diameter increases the frictional torque.

FIG. 11 illustrates still another embodiment of the present invention which is similar in many respects to the assembly of shifting key elements shown in FIG. 8. However, in the embodiment shown in FIG. 11 the zigzag strips 71 interconnecting the keys 70 provide the spring action. Also, both ends of each shifting key 70 are in coil form for the purpose of synchronizing the clutch hub sleeve in both directions by use of a single component. In operation, the coil-wound ends of the shifting key 70 fit into recesses in synchronizer rings with a slight pressurized contact with the bottom of the recess. This prevents the synchronizer ring from being radially moved which might cause it to pop out.

Details of several embodiments of the present invention have been described above. As is clear, an adequate number of shifting keys are provided in each assembly of shifting key elements. Also, the shifting keys are circumferentially integrated so that all the keys act as single unit thereby preventing them from popping out and causes malfunctions of the gear change mechanism. Also, the integration of shifting keys eliminates extreme difficulty in the assembling procedures when compared to conventional synchronizer mechanisms wherein the shifting keys are separate from one another and the key springs are also separate pieces.

What is claimed is:

1. In a change gear comprising a rotating gear and a coaxially disposed rotatable gear, a clutch hub sleeve connected to the rotatable gear for rotation therewith but axially slidable relative thereto, a coaxial rotatable synchronizer ring between the gears connected to rotate with the clutch hub sleeve and the rotatable gear and arranged to transmit the rotational motion of the rotating gear to the rotatable gear when the clutch hub sleeve is axially shifted toward the rotating gear, and an assembly of key elements located on the outside of the rotatable gear between the rotatable gear and the inside of the clutch hub sleeve engaging the synchronizer ring and arranged to move with the clutch hub sleeve whereby axial shifting of the clutch hub sleeve toward the rotating gear causes the assembly of key elements to force the synchronizer ring frictionally against the rotating gear, the improvement comprising an assembly of shifting key elements wherein the individual key elements of the assembly are integrally connected together in continuous unbroken fashion and outwardly spring biased.

2. The combination of claim 1 in which the assembly of shifting key elements includes a circular ring located between the outside of the rotatable gear and the inside of the clutch hub sleeve coaxially disposed relative to the gears, and a plurality of spring members connected to the circular ring and extending radially outwardly therefrom, each spring member connecting one of the shifting key elements to the circular ring.

3. The combination of claim 2 in which each shifting key element comprises an integral free end portion of one of the spring members.

4. The combination of claim 1 in which the assembly of shifting key elements includes a circular ring located between the outside of the rotatable gear and the inside of the clutch hub sleeve with the key elements directly connected to the ring.

5. The combination of claim 4 in which the circular ring has a zigzag configuration constructed and arranged to exert a radially outward spring force on the key elements whereby the elements are urged against the inside of the clutch hub sleeve.

* * * * *